United States Patent [19]
Huong

[11] Patent Number: 5,996,179
[45] Date of Patent: Dec. 7, 1999

[54] DEVICE FOR PREVENTING INADVERTENT PRESSING OF PUSH BUTTON KEYS

[75] Inventor: Chin-Fu Huong, Taipei Hsien, Taiwan

[73] Assignee: Chin-Fu Huong & Li-Hua Liu, Taipei, Taiwan

[21] Appl. No.: 09/130,452

[22] Filed: Aug. 7, 1998

[51] Int. Cl.[6] ................................................. E05D 11/10
[52] U.S. Cl. ................................ 16/330; 16/303; 16/284
[58] Field of Search ............................ 16/330, 327, 328,
16/303, 304, 307, 331, 332, 341, 342, 284, 285

[56] References Cited

U.S. PATENT DOCUMENTS

| | | | |
|---|---|---|---|
| 5,317,785 | 6/1994 | Kobayashi | 16/322 |
| 5,628,089 | 5/1997 | Wilcox et al. | 16/303 |
| 5,697,124 | 12/1997 | Jung | 16/341 |
| 5,704,094 | 1/1998 | Hartigan et al. | 16/303 |

*Primary Examiner*—Chuck Y. Mah
*Attorney, Agent, or Firm*—Dougherty & Troxell

[57] ABSTRACT

A device for preventing inadvertent pressing of push button keys of an article, including an upper cover means, a turning axle means, and a pivot joint means. When an upper cover plate of the upper cover means is lifted, pointed portions of two curved projections of a relay axle of the turning axle means will displace along end recesses to pointed portions of two curved ends, so that the relay axle presses a retractable spring and displace radially in a transverse direction, so that its end wings extend into a wing chamber while two side wings extend into an end chamber. When the pointed portions of the two curved projections pass over the pointed portions of the two curved ends, since the pointed portions of the curved projections lose support thereof, they turn axially along the end recesses by means of the resilience of the spring until being positioned. Hence, the upper cover plate can automatically be uplifted about a certain angle to facilitate pressing of the push button keys.

6 Claims, 4 Drawing Sheets

5,996,179

DEVICE FOR PREVENTING INADVERTENT PRESSING OF PUSH BUTTON KEYS

BACKGROUND OF THE INVENTION (a) Field of the Invention

With the progress of technologies, life is becoming more and more convenient. Most of the household electrical appliances, such as television, stereo sets, video recorders, compact disk players, etc., are equipped with remote controllers. By pressing push button keys on the remote controllers, the corresponding electrical appliance will be actuated to perform the designated function. For telecommunication equipment, such as the telephones, mobile phones, facsimile machines, etc., they are mostly controlled by means of push button keys as well. With the development of integrated circuits, in order to save time in flipping through telephone directories or name cards, telephones and facsimile machines, for instance, have speed dialing and repeat functions, etc. The user only needs to pre-set telephone or facsimile numbers in the equipment, and can then press a certain key or certain keys to accomplish automatic dialing. This is indeed convenient and saves time.

However, as telephone and facsimile numbers are often difficult to memorize, if the wrong key is pressed and the wrong pre-set numbers are automatically dialed, it will be a waste of time and an increase in telephone and facsimile expenses. For facsimile machines, children may play with the push buttons and trigger the automatic dialing function. For mobile phones, the wrong key may be pressed when held in the hand since a little pressure on the key will trigger the designated function. Therefore, it is desirable to have a device that can prevent inadvertent pressing of push button keys of equipment as mentioned above.

(b) Description of the Prior Art

Some existing mobile phones are provided with a liftable or slidable cover. However, as such a cover has to be completely lifted to allow access to the push buttons, and is connected to both sides of the bottom portion of the phone body by hinges or cooperating coupling members, after a period of use, the connection between the phone body and the cover will become loosened due to constant friction. Therefore, most of the existing mobile phones are not equipped with liftable or slidable covers, and the problem of inadvertent pressing the push button keys remains unsolved.

SUMMARY OF THE INVENTION

A primary object of the present invention is to provide a device for preventing inadvertent pressing of push button keys of an article.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
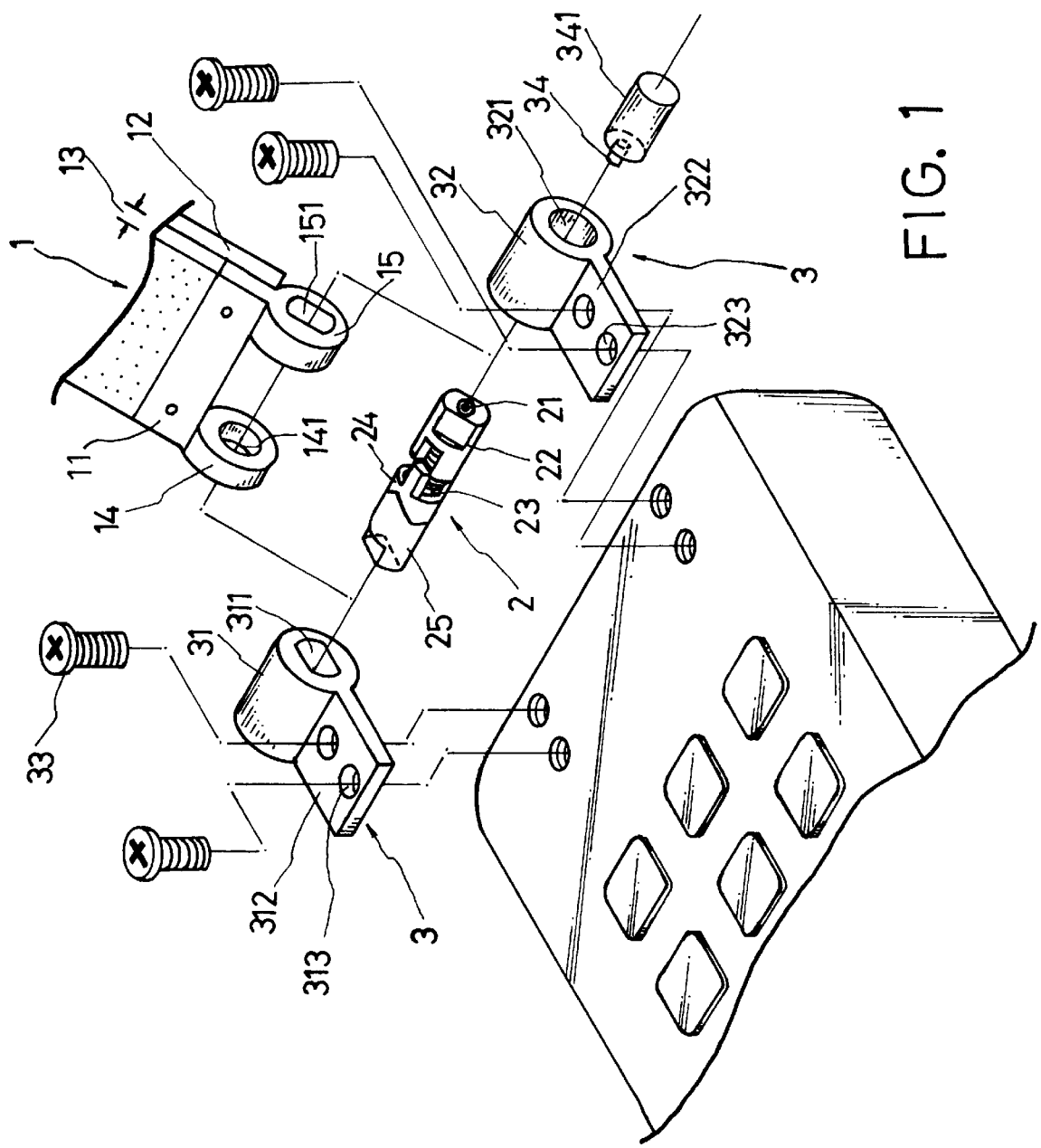
FIG. 1 is a perspective exploded view of the present invention.
Figure 2:
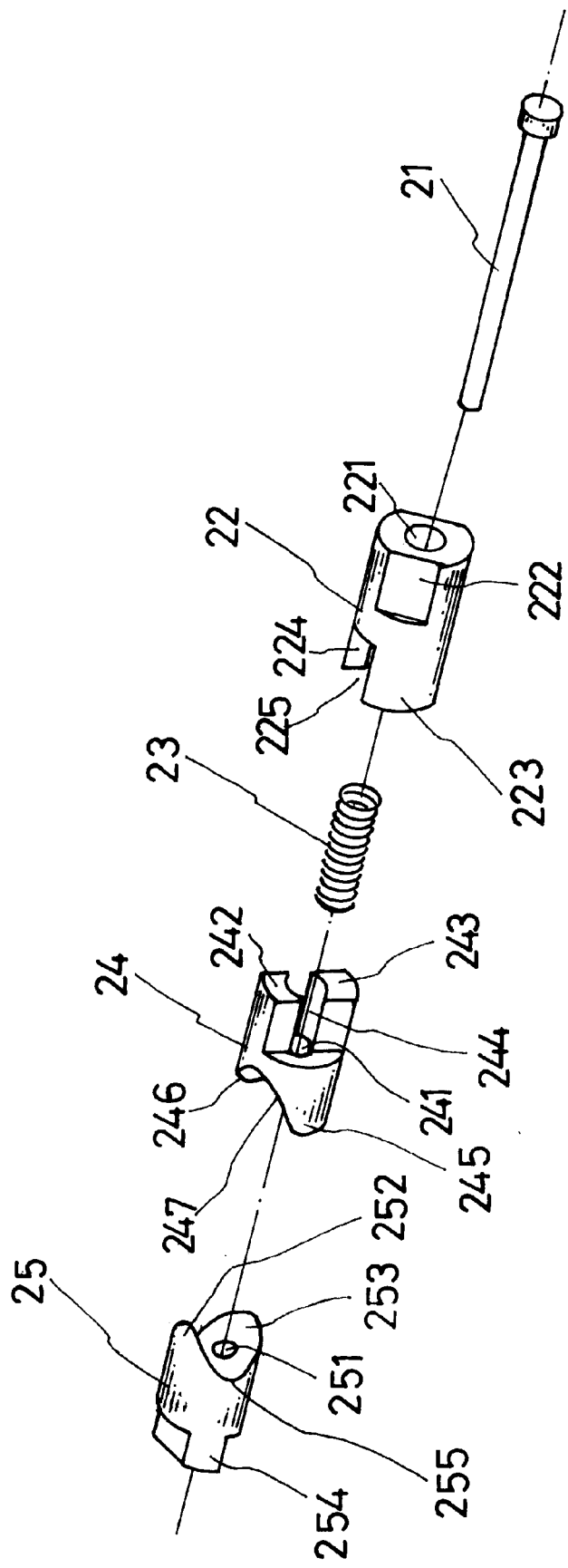
FIG. 2 is a perspective exploded schematic view of the rotary shaft device according to the present invention.

With reference to FIGS. 1 and 2, a preferred embodiment of the device for preventing inadvertent pressing of push button keys according to the present invention essentially comprises an upper cover means 1, a turning axle means 2, and a pivot joint means 3.

The upper cover means 1 includes an upper cover support 11 and an upper cover plate 12, defining a plate clearance 13. The plate clearance 13 corresponds to the height of the push button key. The size of the upper cover plate 12 also corresponds to the area defined by a plurality of push button keys to be concealed thereby. The two sides of the upper cover support 11 respectively extend downwardly to form a left axle ring 14 and a right axle ring 15. The left axle ring 14 is internally formed with a round left axle hole 141, whereas the right axle ring 15 is internally formed with an oblong elliptical right axle hole 151 for passage and reception of the turning axle means 2.

The turning axle means 2 essentially includes a spindle 21 that passes through a right side axle 22 and a retractable spring 23 and then through a relay axle 24 and a left side axle 25 to be riveted in position. The right side axle 22 is centrally provided with a right side axle hole 221 for passage of the spindle 21, and its right end portion has a right axle post 222 corresponding to the right axle hole 151 for inter-engagement to form a securing end. The front and rear ends of the other side of the right axle post 222 respectively extend outwardly to form a front side wing 223 and a rear side wing 224, with a wing chamber 225 defined therebetween for receiving the retractable spring 23 as well as passage of the spindle 21. The center of the relay axle 24 is likewise provided with a relay axle hole 241 for passage of the spindle 21. The relay axle 24 is further provided with upper and lower end wings 242, 243 located in an alternate relation with the front and rear side wings 223, 224 of the right axle post 222 such that a theoretical cylindrical body is formed after the two side wings and the end wings are butt joined. An end chamber 244 is also formed between the upper and lower end wings 242, 243 for receiving the retractable spring 23. Furthermore, a front curved projection 245 and a rear curved projection 246 extend from the other side of the two end wings and face each other, for butt joining with the left side axle 25. The center of the left side axle 25 is also provided with a left side axle hole 251 for passage of the spindle 21. The left side axle 25 is inwardly provided with an upper curved end 252 and a lower curved end 253 that are arranged in an alternate relation with the front and rear curved projections 245, 246 so that they can be butt joined. In addition, the other side of the upper and lower curved ends 252, 253 has an oblong elliptical left axle post 254 for passing through the left axle hole 141 to connect to the pivot joint means 3. The pivot joint means 3 includes a left joint 31 and a right joint 32, if it is to be configured to be separable from the article on which the device of the present invention is used. The center of the left joint 31 is transversely formed with an oblong elliptical left joint hole 311, with one side extending to form a left wing plate 312. Screws 33 are used to pass through left plate holes 313 of the left wing plate 312 to lock the left joint 31 to one end of the article. The left axle post 254 is inserted into the left joint hole 311 to form a securing end. On the other hand, the center of the right joint 32 is transversely provided with a round right joint hole 321 for receiving the right axle post 222. The right joint 32 likewise has a right wing plate 322, and screws 33 are used to pass through right plate holes 323 of the right wing plate 322 to lock the right joint 32 to the other end of the article. The upper cover means 1 and the turning axle means 2 can be pivotally held between the left and right joints 31, 32.

Figure 3:
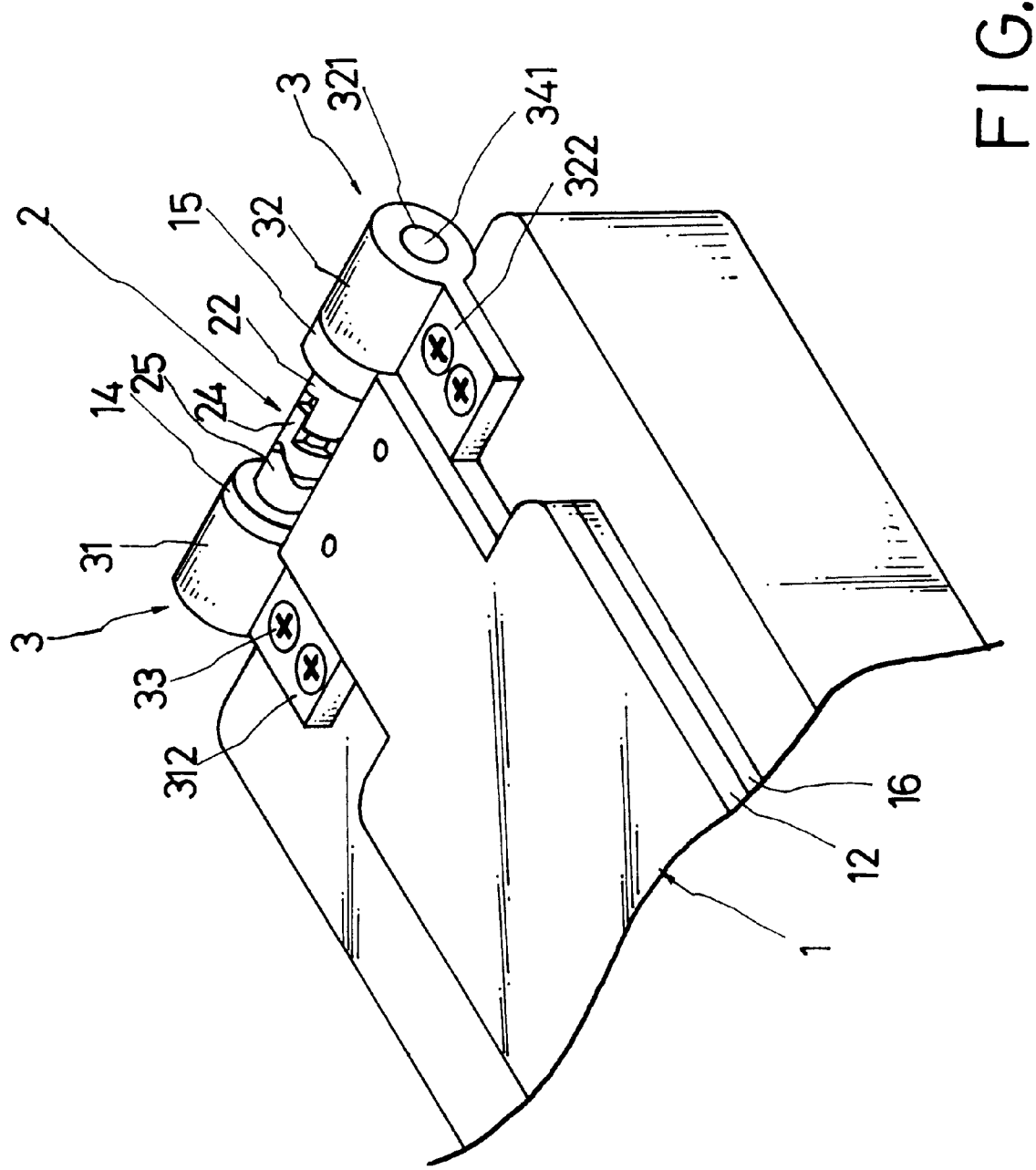
FIG. 3 is a perspective view of the present invention in a non-operating state.
Figure 4:
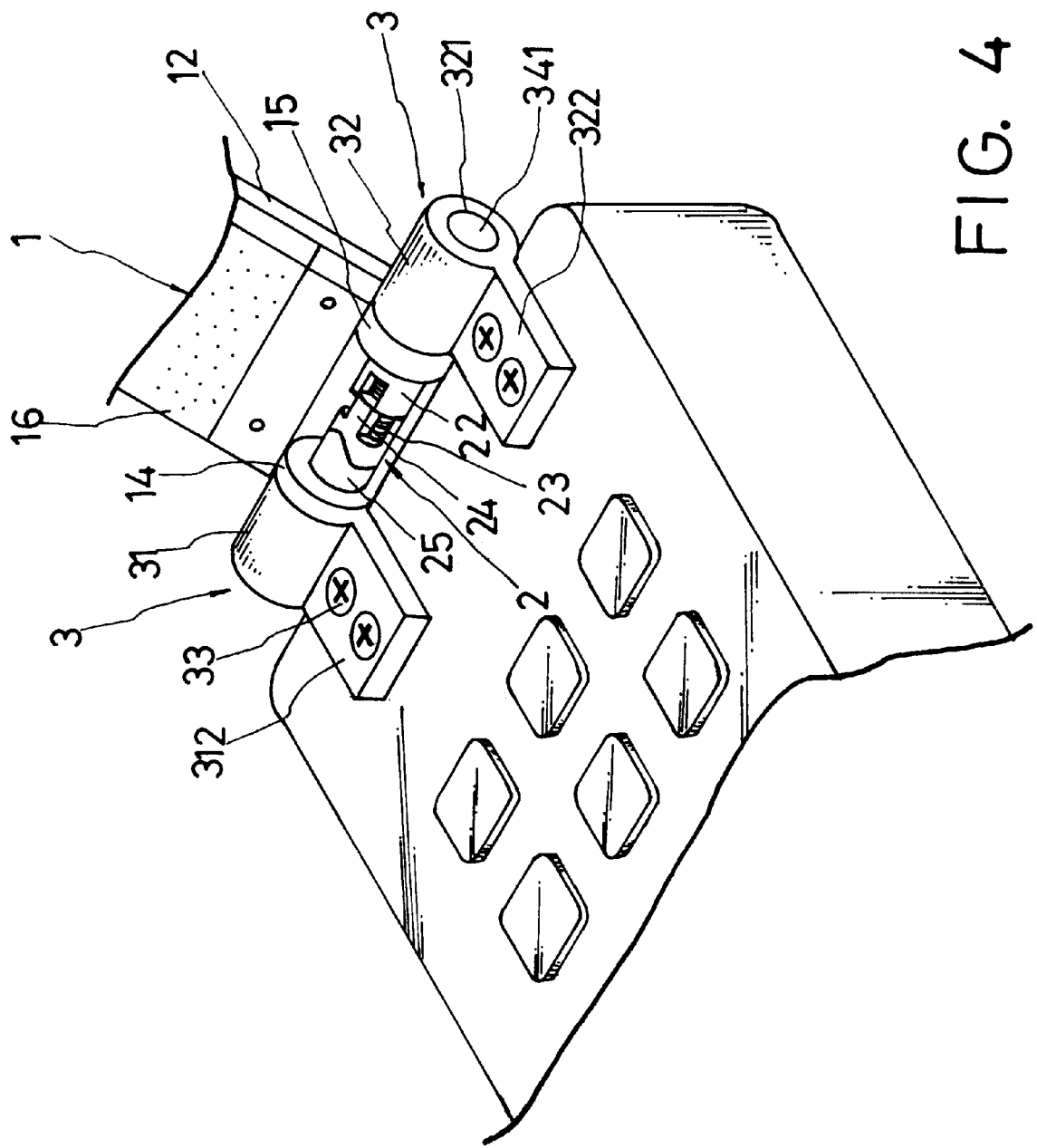
FIG. 4 is a perspective view of the present invention in an operating state.

In addition, the pivot joint means 3 may also be integrally provided on the article on which the device of the present invention is used. A left pivot joint 31 and a right joint 32 respectively extend from an appropriate end of the article. The left joint 31 has an oblong elliptical left joint hole 311, whereas the right joint 32 has a round left joint hole 321. Since the two joints are fixed, the size of the turning axle means 2 in the two axle rings 14, 15 of the upper cover means 1 is configured to be identical with the distance between the two ends of the axle rings so that, after the upper cover means 1 and the turning axle means 2 are placed between the two joints, a plug 34 having a top axle 341 can be inserted from the outer side of the right joint hole 321 to push the entire turning axle device 2 so that the left axle post 254 fits into the left joint hole 311, while the top axle 341 inserts into the right joint hole 321 to achieve positioning of the two ends. When use of the push button keys is desired, the upper cover plate 12 is firstly of all lifted lightly. At this point, since the left axle post 254 of the left side axle 25 is engaging the left joint hole 311 of the left joint 31, it remains stationary. And the right axle post 222 of the right side axle 22 engages the right axle hole 151, and is also stationary. Hence, the front and rear curved projections 245, 246 of the relay axle 24 axially turns along curved end recesses 255 of the upper and lower curved ends 252, 253, further causing the relay axle 24 to press against the retractable spring 23, so that the end wings 242, 243 extend into the wing chamber 225 of the right side axle 22, while the side wings 223, 224 extend into the end chamber 244, thereby forming a radial displacement. And when the ends of the front and rear curved projections 245, 246 pass over the ends of the upper and lower curved ends 252, 253, since there are curved recesses 247 between the curved projections 245, 246, and there are the curved end recesses 255 between the curved ends 252, 253, the front and rear curved projections 245, 246 will lose support thereof and, by utilizing the resetting force of the retractable spring 23, automatically displaces to the end recesses 255 between the upper and lower curved ends 252, 253 in a quick manner. And the upper and lower curved ends 252, 253 will also move into the curved recesses 247 between the front and rear curved projections 245, 246 to lift the upper cover plate 12 at an angle of elevation such as that shown in FIG. 4. At this time, the user can proceed with the pressing of the keys. To cover the keys, it is only necessary to operate the upper cover plate 12 in a reverse directly so that the front and rear curved projections 245, 246 pass over the upper and lower curved ends 252, 253, and, by means of the resetting force of the retractable spring 23, the curved projections and curved ends are positioned on the end recesses 255 and the curved recesses 247. FIG. 3 illustrates the cover concealing the keys.

In particular, a soft material 16 may be adhered to the plate clearance 13 to provide a protection to the keys.

In view of the aforesaid, the present invention not only prevents inadvertent pressing of push button keys but also protects the keys from contact with dusts or liquid to thereby ensure the service life of the keys.

Although the present invention has been illustrated and described with reference to the preferred embodiment thereof, it should be understood that it is in no way limited to the details of such embodiment but is capable of numerous modifications within the scope of the appended claims.

What is claimed is:

1. A device for preventing the inadvertent pressing of push button keys of an article, comprising:

an upper cover including an upper cover support having a left axle ring and a right axle ring, said left axle ring having a round axle hole, said right axle ring having an oblong axle hole, and an upper cover plate extending from the upper cover support;

a turning axle assembly, including a right side axle having a right axle post inserted into the oblong axle hole so as to rotate with said right axle ring and two side wings with a wing chamber defined therebetween; a relay axle, in which one end of said relay axle has two opposed end wings extending between said two side wings, with an end chamber defined between said two end wings, an opposite end of said relay axle having two opposed curved projections, with two curved recesses defined therebetween; a left side axle, one end of said left side axle having two opposed curved ends located in an alternate relation with said two curved projections and defining two end recesses therebetween, such that said curved projections and said curved ends are engaged with each other, an opposite end of said left side axle having a left axle post passing through said left axle hole; a spring located in said wing chamber and said end chamber and acting on said relay axle so as to bias the curved projections into engagement with the curved ends of the left side axle; and, a spindle passing through said right side axle, said relay axle and said left side axle; and, a pivot joint means, including a left joint and a right joint fixedly provided on an end portion of the article having the push button keys, said left joint having an oblong left joint hole receiving said left axle post so as to prevent relative rotation therebetween, said right joint having a round right joint hole receiving and positioning said right axle post, whereby the engagement of the curved projections and curved ends hold the cover in one of two positions, a first position in which the upper cover covers the push button keys to prevent inadvertent pressing of the push button keys and a second position in which the upper cover is displaced away from the push button keys to permit access to said push button keys.

2. The device as defined in claim 1 further comprising a soft material adhered to said upper cover plate.

3. The device as defined in claim 1, wherein said side wings and said end wings are configured to form a cylindrical shape when they are engaged.

4. The device as defined in claim 1, wherein said curved projections and said curved ends are configured form a cylindrical shape when they are engaged.

5. The device as defined in claim 1, wherein said left and right joints of said pivot joint means are separable from the article having the push button keys, said left and right joints each further comprising a wing plate, each of said wing plates having holes for passage of screws to attach said left and right joints to the article.

6. The device as defined in claim 1, further comprising a plug having a top axle extending through said right joint and engaging said right side axle.

* * * * *